United States Patent
Esler et al.

(10) Patent No.: US 6,276,537 B1
(45) Date of Patent: Aug. 21, 2001

(54) ENHANCED FLOCCULATION AND ENERGY DISSIPATION FEEDWELL ASSEMBLY FOR WATER AND WASTEWATER TREATMENT CLARIFIERS

(76) Inventors: John K. Esler, 19 Elmwood St., Albany, NY (US) 12203; William J. Hartnett, 23725 Cabrillo Ave., Torrance, CA (US) 90501; Roger A. Haug, 5119 Newton St., Torrance, CA (US) 90505

( * ) Notice: Subject to any disclaimer, the term of this patent is extended or adjusted under 35 U.S.C. 154(b) by 0 days.

(21) Appl. No.: 09/429,912

(22) Filed: Oct. 29, 1999

Related U.S. Application Data

(60) Provisional application No. 60/111,474, filed on Dec. 9, 1998.

(51) Int. Cl.[7] ..................................................... B01D 21/24
(52) U.S. Cl. ...................... 210/519; 210/528; 210/532.1; 210/541
(58) Field of Search ................................ 210/512.1, 519, 210/525, 528, 532.1, 538, 541

(56) References Cited

U.S. PATENT DOCUMENTS

| | | | |
|---|---|---|---|
| 1,102,463 | * 7/1914 | Wyckoff | 210/519 |
| 1,434,597 | * 11/1922 | Dorr | 210/528 |
| 2,380,252 | 7/1945 | McBride . | |
| 2,429,315 | 10/1947 | Green | 210/16 |
| 2,678,916 | 5/1954 | Kalinske | 210/16 |
| 2,702,124 | 2/1955 | Stengel | 210/51 |
| 2,886,175 | 5/1959 | Kalinske | 210/208 |
| 3,006,474 | 10/1961 | Fitch | 210/84 |
| 3,175,692 | 3/1965 | Vrablik | 210/519 |
| 3,216,570 | * 11/1965 | Cunetta | 210/528 |
| 3,236,384 | 2/1966 | Sontheimer et al. | 210/16 |
| 3,300,047 | 1/1967 | Hirsch | 210/197 |
| 3,822,788 | 7/1974 | Dunkers et al. | 210/200 |
| 3,850,810 | 11/1974 | Teodoroiu | 210/208 |
| 3,891,557 | 6/1975 | Edgerton | 210/519 |
| 3,926,805 | * 12/1975 | Walker | 210/519 |
| 3,966,617 | 6/1976 | Zaenkert | 210/519 |
| 4,127,488 | * 11/1978 | Bell et al. | 210/519 |
| 4,270,676 | 6/1981 | Green | 222/485 |
| 4,278,541 | * 7/1981 | Eis et al. | 210/528 |
| 4,304,666 | 12/1981 | Van Note | 210/197 |

(List continued on next page.)

FOREIGN PATENT DOCUMENTS

| | | |
|---|---|---|
| 1170335 | 5/1964 | (DE) . |
| 1313483 | 5/1987 | (SU) . |

*Primary Examiner*—Christopher Upton
(74) *Attorney, Agent, or Firm*—Flanagan & Flanagan; John R. Flanagan; John K. Flanagan

(57) ABSTRACT

An enhanced flocculation and energy dissipation feedwell assembly includes an influent feedwell and a plurality of feed outlet structures. The influent feedwell is disposed about an influent riser pipe of a clarifier from which a liquid enters the influent feedwell. The influent feedwell has a bottom wall and a continuous side wall. The bottom wall has a plurality of holes therethrough. The feed outlet structures are supported below the influent feedwell such that adjacent ones are directed to achieving opposing jets of liquid flow to enhance flocculation and distribution and dissipate energy and thereby minimize formation of currents. Each feed outlet structure includes a first tubular portion and a plurality of second tubular portions. An upper end of the first tubular portion is open and attached to and about one of the holes in the bottom wall of the influent feedwell such that the liquid flows in a first direction from inside the influent feedwell through the open upper end of and into the first tubular portion of the feed outlet structure. A lower end of the first tubular portion is closed. Each second tubular portion is arranged about and attached adjacent to the lower end of the first tubular portion such that the liquid flows in a second direction different from the first direction from inside the first tubular portion through the second tubular portion to a sedimentation section of the clarifier.

23 Claims, 3 Drawing Sheets

U.S. PATENT DOCUMENTS

| | | | |
|---|---|---|---|
| 4,376,045 | 3/1983 | Siskind | 210/134 |
| 4,490,251 * | 12/1984 | Quintana et al. | 210/519 |
| 4,592,845 | 6/1986 | Lejeune et al. | 210/715 |
| 4,985,148 | 1/1991 | Monteith | 210/519 |
| 4,999,115 * | 3/1991 | Peterson | 210/519 |
| 5,244,573 * | 9/1993 | Horisawa | 210/519 |
| 5,378,378 * | 1/1995 | Meurer | 210/512.1 |
| 5,384,049 | 1/1995 | Murphy | 210/629 |
| 5,714,068 | 2/1998 | Brown | 210/519 |
| 6,068,765 * | 5/2000 | Monteith | 210/519 |

* cited by examiner

ENHANCED FLOCCULATION AND ENERGY DISSIPATION FEEDWELL ASSEMBLY FOR WATER AND WASTEWATER TREATMENT CLARIFIERS

This patent application claims the benefit of U.S. provisional application No. 60/111,474, filed Dec. 9, 1998.

BACKGROUND OF THE INVENTION

1. Field of the Invention

The present invention generally relates to feedwell assemblies and, more particularly, is concerned with an enhanced flocculation and energy dissipation feedwell assembly for water and wastewater treatment clarifiers.

2. Description of the Prior Art

A clarifier is a reactor whose purpose is to separate solids from water or wastewater. These solids must be able to settle and to form sediments. For a clarifier to function properly, particulates in the wastewater must be allowed to flocculate and form solids that can be removed from the water. Problems exist, however, in the process of flocculating and separating solids. Effective separation of the solids may not occur due to poor flocculation and formation of currents within the clarifier. To enhance flocculation, several different types of feedwells (also referred to as stilling wells, influent wells, or center wells) have been developed over the years for use in clarifiers.

Representative examples of prior art feedwells and the like are disclosed in U.S. Pat. No. 2,702,124 to Stengel, U.S. Pat. No. 3,175,692 to Vrablik, U.S. Pat. No. 3,891,557 to Edgerton, U.S. Pat. No. 3,966,617 to Zaenkert, U.S. Pat. No. 4,270,676 to Green, U.S. Pat. No. 4,985,148 to Monteith, U.S. Pat. No. 5,384,049 to Murphy and U.S. Pat. No. 5,714,068 to Brown. None of these prior art feedwells, however, would appear to be effective in reducing or preventing the formation of short-circuit currents within the clarifiers. While baffles employed inside clarifiers have been shown effective in reducing these currents, the use of baffles is limited to certain types and sizes of clarifiers.

Consequently, a need remains for a feedwell assembly which overcomes the aforementioned problems of prior art feedwells without introducing any new problems in place thereof.

SUMMARY OF THE INVENTION

The present invention provides an enhanced flocculation and energy dissipation feedwell assembly designed to satisfy the aforementioned need. The enhanced flocculation and energy dissipation feedwell assembly of the present invention both enhances flocculation, dissipates the inlet energy and reduces formation of currents in a clarifier. The enhanced feedwell assembly slows the flow of and disperses water or wastewater or chemical slurry into the clarifier and allows most of the energy to be dissipated.

Accordingly, the present invention is directed to an enhanced flocculation and energy dissipation feedwell assembly for water and wastewater treatment clarifiers. The feedwell assembly comprises: (a) an influent feedwell for disposing about an influent riser pipe of a clarifier from which a liquid enters the influent feedwell, the influent feedwell having a wall defining at least one and preferably a plurality of holes spaced apart from one another; and (b) at least one and preferably a plurality of feed outlet structures supported on the wall of the influent feedwell, each of the feed outlet structures including (i) a first tubular portion having opposite first and second ends, the first end being open and attached to and surrounding the hole in the wall of the influent feedwell such that the liquid flows in a first direction from inside the influent feedwell through the open first end of and into the first tubular portion, the second end being closed, and (ii) at least one second tubular portion arranged about and attached adjacent to the second end of the first tubular portion such that the liquid flows in a second direction different from the first direction from inside the first tubular portion through the second tubular portion to a sedimentation section of the clarifier.

More particularly, the wall of the influent feedwell includes a bottom wall having a periphery, an opening for receiving the influent riser pipe therethrough, and the plurality of holes being spaced outwardly from the opening and spaced inwardly from the periphery and spaced apart from one another about the opening. The wall of the influent feedwell also includes a continuous side wall connected to the bottom wall and spaced outwardly from the holes of the bottom wall and being disposed substantially upright from the bottom wall. The opening is formed at a center of the bottom wall. The holes of the bottom wall are spaced radially outwardly from the opening and along a circle concentric with the opening. The bottom wall has an inner rim encircling the opening of the bottom wall. The assembly further comprises an annular seal extending between and mounted to at least one of the bottom wall and the influent riser pipe of the clarifier and extending over the inner rim and sealing the opening of the bottom wall.

The feed outlet structure preferably has a plurality of second tubular portions arranged about and attached adjacent to the second end of the first tubular portion so as to have a substantially X-shaped configuration when viewed from above or below. The second tubular portions on the same side of the first tubular portion are laterally spaced apart and extend substantially parallel with one another such that the plurality of second tubular portions includes an outer pair and an inner pair thereof. Each of the second tubular portions of the feed outlet structure has a diameter less than a diameter of the first tubular portion. Additionally, at least some of the second tubular portions have a full annular inner section and a partial annular outer section, the outer section being open along a top thereof. The inner section of the respective second tubular portion has a bend at an intermediate location thereon.

The present invention is also directed to a feedwell assembly which comprises: (a) an influent feedwell for disposing about an influent riser pipe of a clarifier from which a liquid enters the influent feedwell, the influent feedwell having a wall defining at least one and preferably a plurality of holes; and (b) at least one and preferably a plurality of feed outlet structures supported below the wall of the influent feedwell such that adjacent ones of the feed outlet structures are directed relative to one another so as to provide opposing jets of discharging liquid to enhance flocculation and distribution of flow and dissipate energy so as to minimize formation of currents, each of the feed outlet structures including (i) a first tubular portion having opposite upper and lower ends, the upper end being open and attached to and about the hole in the wall of the influent feedwell such that the liquid flows in a first direction from inside the influent feedwell through the open upper end of and into the first tubular portion of the feed outlet structure, the lower end of the first tubular portion being closed, and (ii) at least one and preferably a plurality of second tubular portions arranged about and attached adjacent to the lower end of the first tubular portion such that the liquid flows in a second direction different from the first direction from inside the first tubular portion through the second tubular portion to a sedimentation section of the clarifier.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Figure 1:
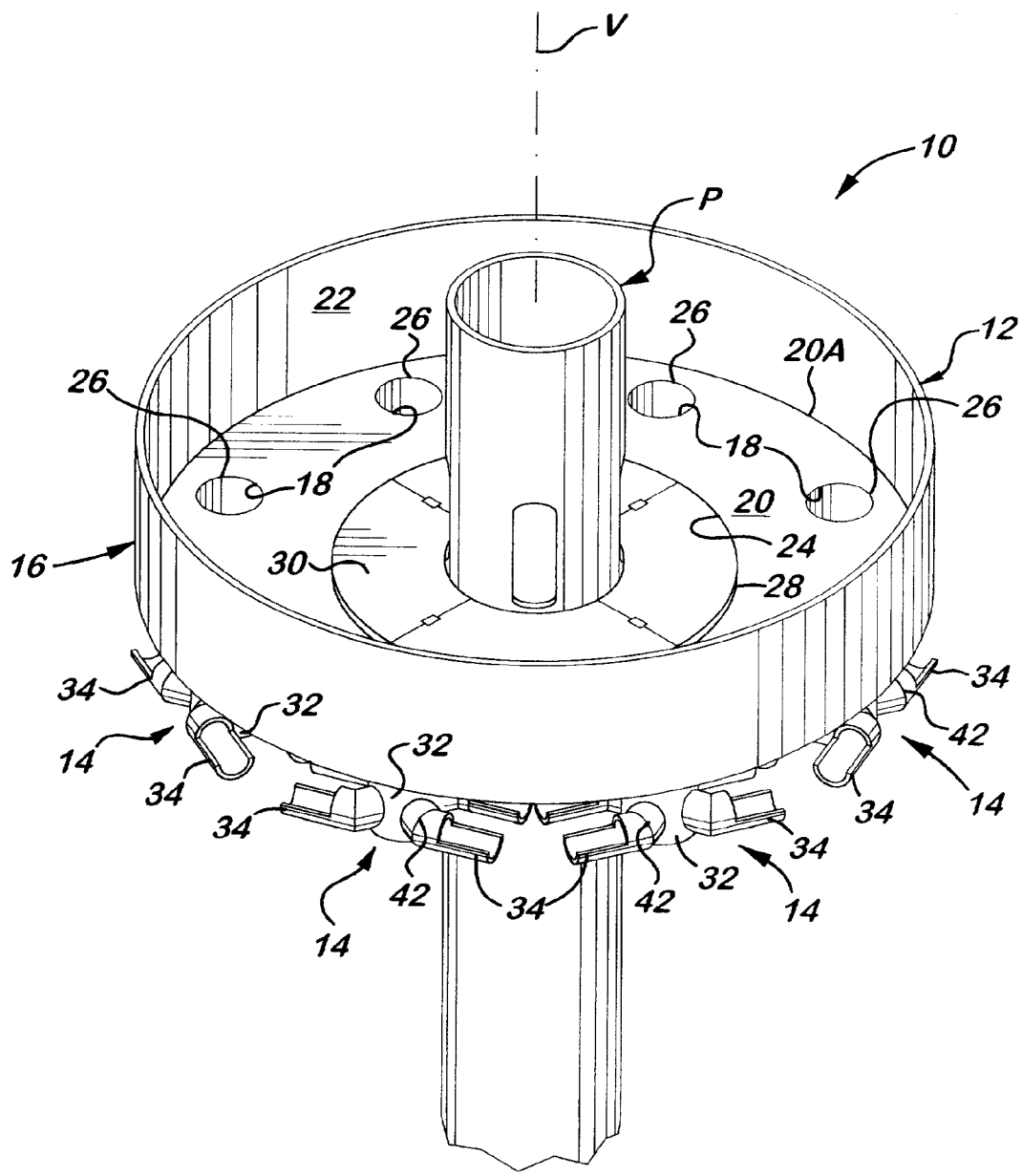
FIG. 1 is a perspective view of an enhanced flocculation and energy dissipation feedwell assembly of the present invention mounted to an influent riser pipe of a clarifier.

Referring to the drawings and particularly to FIG. 1, there is illustrated an enhanced flocculation and energy dissipation feedwell assembly, generally designated 10, of the present invention which is mounted to an influent riser pipe P of a clarifier (not shown). Basically, the enhanced feedwell assembly 10 includes an influent feedwell 12 and at least one and preferably a plurality of feed outlet structures 14 supported by the influent feedwell 12. Liquid, such as water or wastewater, enters the influent feedwell 12 from the influent riser pipe P. The feed outlet structures 14 are preferably disposed below the influent feedwell 12, though in some applications may be disposed at any other suitable locations.

Figure 2:
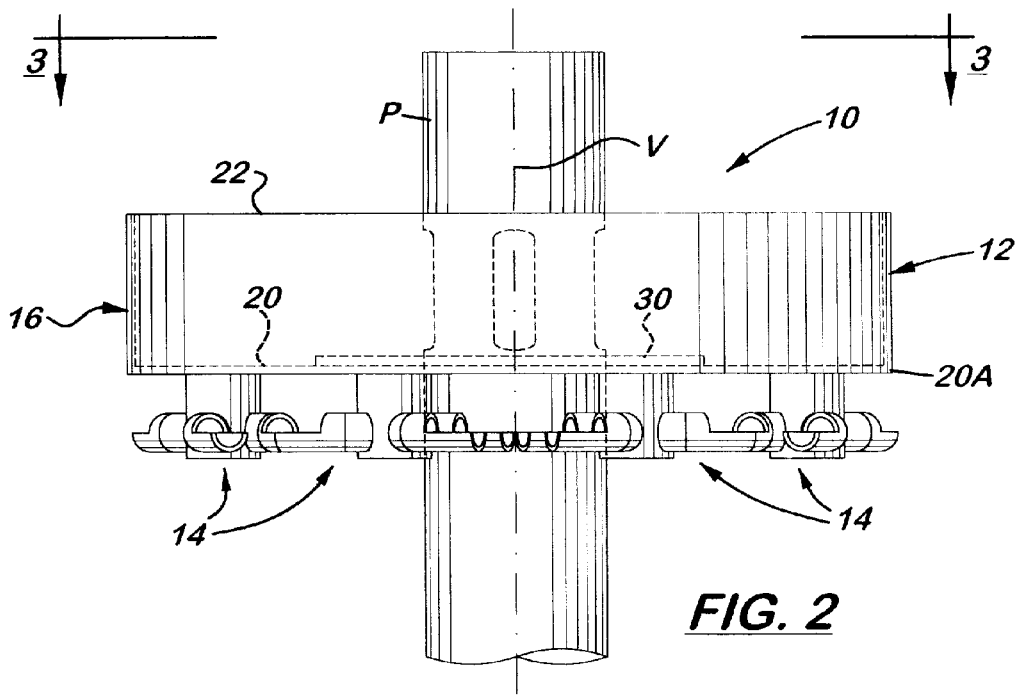
FIG. 2 is a side elevational view of the feedwell assembly and the influent riser pipe of FIG. 1.
Figure 3:
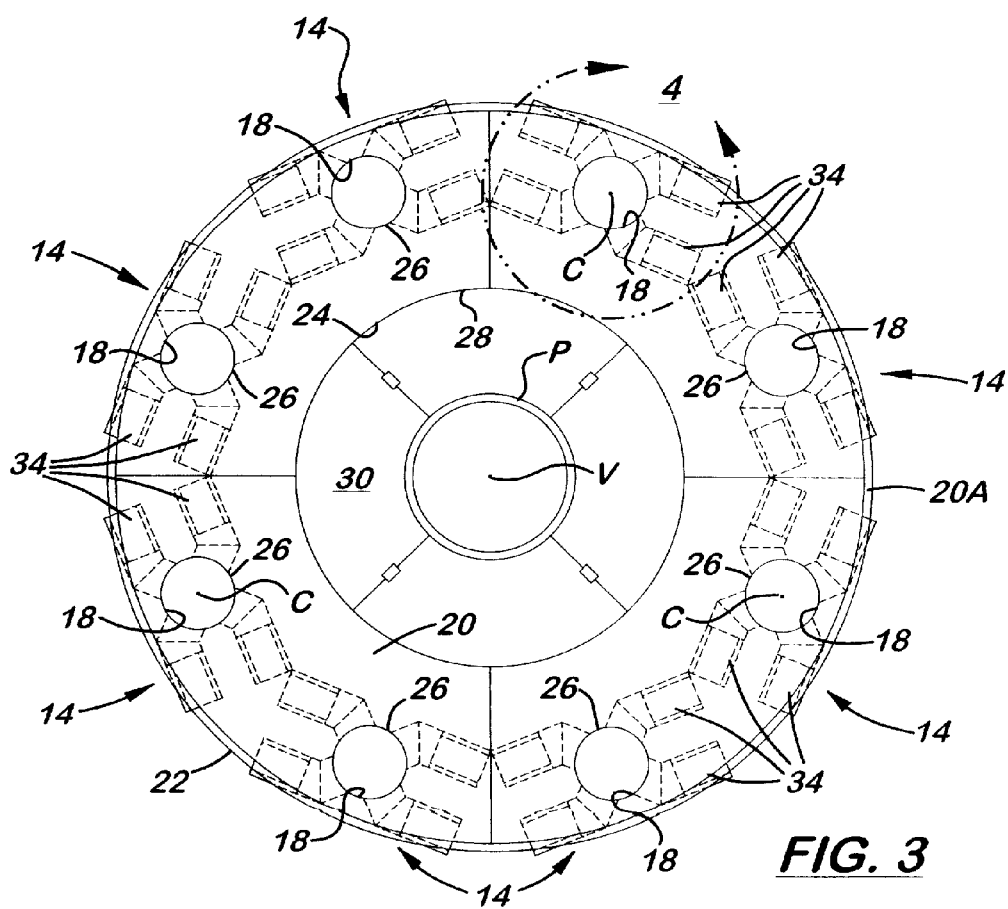
FIG. 3 is a top plan view of the feedwell assembly and the influent riser pipe as seen along line 3—3 of FIG. 2.

Referring now to FIGS. 1 to 3, the influent feedwell 12 is shown. The influent feedwell 12 has a size which is substantially a function of the size of the clarifier. The influent feedwell 12, generally, has a wall 16 which defines at least one and preferably a plurality of holes 18. The wall 16 of the influent feedwell 12, more particularly, includes a bottom wall 20 and a continuous side wall 22. The bottom wall 20 has a substantially circular configuration of any suitable diameter and a periphery 20A. The side wall 22 has a substantially cylindrical configuration of a diameter substantially similar to the diameter of the bottom wall 20. The side wall 22 is connected to the bottom wall 20 at its periphery 20A and is disposed substantially upright from the bottom wall 20. Alternatively to a circular configuration, the bottom and side walls 20, 22 can have polygonal shapes.

The bottom wall 20 of the influent feedwell 12 defines an opening 24. The opening 24 is, particularly, defined at a center of the bottom wall 20. The influent feedwell 12 is disposed concentrically about the influent riser pipe P of the clarifier and the opening 24 receives the influent riser pipe P therethrough. The opening 24 has a substantially circular configuration, but alternatively could have a polygonal shape, and is concentric about a vertical axis V of the influent riser pipe P and influent feedwell 12. The opening 24 has a diameter which is substantially less than the diameters of the bottom and side walls 20, 22 of the influent feedwell 12.

The bottom wall 20 of the influent feedwell 12 also defines the plurality of holes 18. The holes 18 are spaced outwardly from the opening 24 and spaced inwardly from the periphery 20A and spaced apart from one another. In the illustrated example, the holes 18 are eight in number. The holes 18 are spaced radially outwardly from the opening 24 and along a circle concentric with the opening 24. The side wall 22 of the influent feedwell 12 is spaced outwardly from the holes 18. Each of the holes 18 has a substantially circular configuration and a diameter substantially less than the diameter of the opening 24. The bottom wall 20 also has a plurality of interior rims 26. Each interior rim 26 encircles one of the holes 18. The bottom wall 20 also has an inner rim 28. Inner rim 28 encircles opening 24 of the bottom wall 20.

The assembly 10 further may include an annular seal 30. The annular seal 30 extends between and is mounted to at least one of the bottom wall 20 of the influent feedwell 12 and the influent riser pipe P of the clarifier and extends over the inner rim 28 and seals the opening 24 of the bottom wall 20. The annular seal 30 may be flexible or fixed in relation to one of the bottom wall 20 of the influent feedwell 12 and the influent riser pipe P of the clarifier. If the influent feedwell 12 rotates with rotating portions of the clarifier, the annular seal 30 contains the water or wastewater in the influent feedwell 12 and minimizes leakage therefrom about the influent riser pipe P. Water or wastewater enters the clarifier by first flowing upwardly through the influent riser pipe P and then into the influent feedwell 12. The influent feedwell 12 may be fixed to the influent riser pipe P in any suitable well-known manner or may rotate as part of a rotating system of the clarifier.

Figure 5:
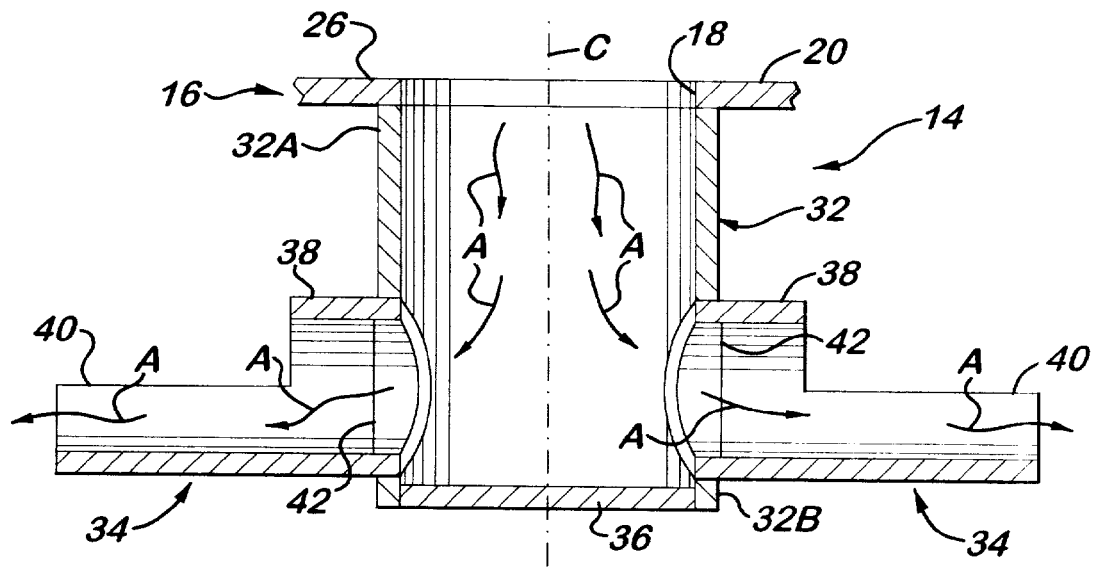
FIG. 5 is a longitudinal sectional view of the feed outlet structure taken along line 5—5 of FIG. 4 with arrows indicating the directions of flow of liquid therethrough.
Figure 4:
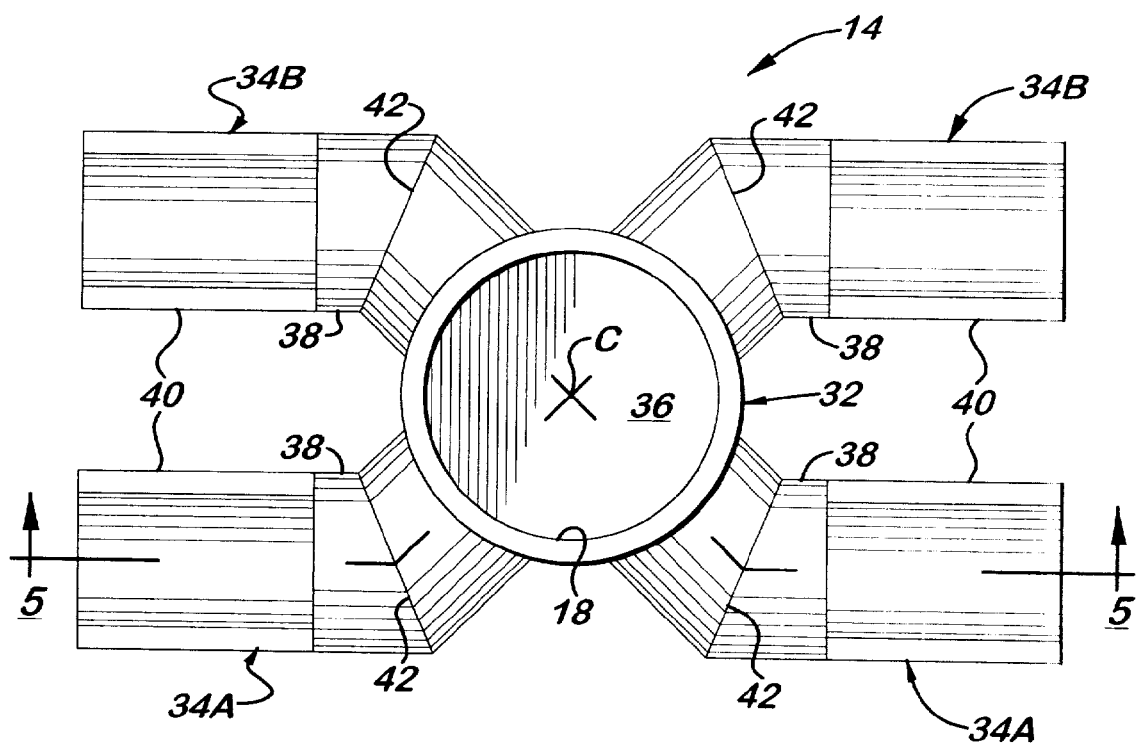
FIG. 4 is an enlarged plan view of the one feed outlet structure encompassed by circle 4 of FIG. 3.

Referring now to FIGS. 4 and 5, the feed outlet structure 14 is shown in detail. In the illustrated example in FIGS. 1–3, the feed outlet structures 14 are eight in number to match the eight holes 18 of the bottom wall 20 of the influent feedwell 12. It should be readily apparent that other numbers of feed outlet structures 14 and holes 18 are possible. Each feed outlet structure 14 includes a first tubular portion 32 and at least one and, preferably, a plurality of second tubular portions 34. In the illustrated example in FIGS. 3 and 5, the feed outlet structures 14 are four in number. The first tubular portion 32 is, preferably, a section of pipe of a substantially cylindrical configuration although it may have other alternative configurations, such as rectangular. The first tubular portion 32 has opposite upper and lower ends 32A, 32B. The upper end 32A is open and fixedly attached to the wall 16, and specifically, to the interior rim 26 about the respective one hole 18 in the bottom wall 20 of the influent feedwell 12. The liquid, as indicated by the arrows A in FIG. 5, flows in a first direction from inside the influent feedwell 12 downward through the hole 18 of the bottom wall 20 and through the open upper end 32A of and into the first tubular portion 32. The first tubular portion 32 has a diameter which is substantially the same as the diameter of the respective one of the holes 18 of the bottom wall 20. The lower end 32B of the first tubular portion 32 is closed by circular plate 36.

The plurality of second tubular portions 34 of each feed outlet structure 14 comprise a set. Each second tubular portion 34 of the set is arranged about and fixedly attached adjacent to the lower end 32B of the first tubular portion 32 such that the liquid flows in a second direction different from the first direction from inside the first tubular portion 32 through the second tubular portion 34 to a sedimentation section of the clarifier (not shown). The set of second tubular portions 34 are disposed in a substantially X-shaped configuration when viewed from above or below, as shown best in FIG. 5. The set of second tubular portions 34 are disposed in a common plane extending transversely to a central axis C of the first tubular portion 32. The second tubular portions 34 on the same side of the first tubular portion 32 are laterally spaced apart and extend substantially parallel with one another such that the set of second tubular portions 34 includes an outer pair 34A and an inner pair 34B of the second tubular portions 34. The second tubular portions 34 of the outer pair 34A extend in opposite directions from the first tubular portion 32 and generally tangentially with respect to the circular arrangement of holes 18 and the first tubular portions 32 of the feed outlet structures 14. The second tubular portions 34 of the inner pair 34B extend in opposite directions from the first tubular portion 32 and are generally tangentially with respect to the circular arrangement of holes 18 and spaced opposite from the second tubular portions 34 of the outer pair 34A.

More particularly, the second tubular portion 34 has a full annular cross-sectionally shaped inner section 38 and a partial annular cross-sectionally shaped outer section 40. More particularly, the inner section 38 preferably has a substantially cylindrical configuration and a length which is less than the length of the first tubular portion 32, though it need not be so limited. The outer section 40 preferably has a substantially semi-cylindrical configuration and a length which is greater than the length of the inner section 32, though it need not be so limited. The second tubular portion 34 has a diameter which is generally uniform along each of the inner and outer sections 38, 40 and which is less than the diameter of the first tubular portion 32, though it need not be so limited. The inner section 38 also has a bend 42 at an intermediate location thereof. The outer section 40 is open along a top thereof.

Each feed outlet structure 14 may be referred to as a multiple feed outlet structure 14 by virtue of there being, preferably, four of the second tubular portions 34. The feed outlet structures 14 are therefore designed using opposing jets to distribute the flow of water or wastewater evenly to the sedimentation section of the clarifier, minimize the formation of currents, such as short-circuit currents, within the sedimentation section, minimize the downward force of the water or wastewater and thereby enhance the flocculation of the particles in the water or wastewater. Due to the arrangements of the second tubular portions 34 of adjacent ones of the feed outlet structures 14, the streams of water or wastewater leaving the respective second tubular portions 34 are intentionally directed to intersect with one another to minimize the formation of currents and thereby disperse with a more even distribution.

To summarize, most clarifiers have currents within them that limit their efficiency. By containing the flow initially entering the clarifier in a manner that enhances flocculation and by introducing the flow into the clarifier through means of opposing jets further enhances flocculation (i.e. creates particles that are larger and more readily settleable), the efficiency of the clarifier for capturing the suspended matter will be increased. By introducing the above described arrangement of the plurality of multiple flow inlet structures 14 into the clarifier a more even distribution of the flow therein is achieved and the formation of currents therein is minimized such that the efficiency of the clarifier for settling and capturing the suspended matter will be further increased. While the feedwell assembly 10 of the present invention is particularly suitable for use in circular wastewater treatment plant clarifiers, it may also be used in circular potable water treatment plant clarifiers. Also, this assembly 10 may be used with or without the typically influent riser pipe P.

Furthermore, in many instances, the influent feedwell 12 is already existing in the clarifier and one or more of the feed outlet structures 14 can be retrofitted thereto along with a bottom wall 20. Further, the feed outlet structures 14 can be mounted to the side wall 22 as an alternative or in addition to the mounting to the bottom wall 20.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

We claim:

1. An enhanced flocculation and energy dissipation feedwell assembly for water and wastewater treatment clarifiers, said assembly comprising:
   (a) an influent feedwell for disposing about an influent riser pipe of a clarifier from which a liquid enters said influent feedwell, said influent feedwell having a wall defining at least one hole; and
   (b) at least one feed outlet structure supported on said wall of said influent feedwell, said feed outlet structure including
      (i) a first tubular portion having opposite first and second ends, said first end being open and attached to and surrounding said hole in said wall of said influent feedwell such that the liquid flows in a first direction from inside said influent feedwell through said open first end of and into said first tubular portion, said second end being closed, and
      (ii) a plurality of second tubular portion arranged about and attached adjacent to said second end of said first tubular portion such that the liquid flows in a second direction different from said first direction from inside said first tubular portion through said second tubular portions to a sedimentation section of the clarifier, each of said second tubular portions of said feed outlet structure having a diameter less than a diameter of said first tubular portion of said feed outlet structure.

2. The assembly of claim 1 wherein said wall of said influent feedwell includes a bottom wall having a periphery and an opening for receiving the influent riser pipe of the clarifier therethrough, said hole being spaced outwardly from said opening in and inwardly from said periphery of said bottom wall.

3. The assembly of claim 2 wherein said wall of said influent feedwell further includes a continuous side wall connected to said bottom wall and spaced outwardly from said holes of said bottom wall and being disposed substantially upright from said bottom wall.

4. The assembly of claim 2 wherein said opening in said bottom wall of said influent feedwell is formed at a center of said bottom wall.

5. The assembly of claim 2 wherein said bottom wall has a plurality of said holes being spaced radially outwardly from said opening in said bottom wall and along a circle concentric with said opening.

6. The assembly of claim 2 wherein:
   said bottom wall of said influent feedwell has an inner rim encircling said opening in said bottom wall; and
   said assembly further comprises an annular seal extending between and mounted to at least one of said bottom wall of said influent feedwell and the influent riser pipe of the clarifier and extending over said inner rim and sealing said opening of said bottom wall.

7. An enhanced flocculation and energy dissipation feedwell assembly for water and wastewater treatment clarifiers, said assembly comprising:

(a) an influent feedwell for disposing about an influent riser pipe of a clarifier from which a liquid enters said influent feedwell, said influent feedwell having a wall defining at least one hole; and (b) at least one feed outlet structure supported on said wall of said influent feedwell, said feed outlet structure including (i) a first tubular portion having opposite first and second ends, said first end being open and attached to and surrounding said hole in said wall of said influent feedwell such that the liquid flows in a first direction from inside said influent feedwell through said open first end of and into said first tubular portion, said second end being closed, and (ii) a plurality of second tubular portions arranged about and attached adjacent to said second end of said first tubular portion so as to have a substantially X-shaped configuration when viewed from above or below and such that the liquid flows in a second direction different from said first direction from inside said first tubular portion through said second tubular portions to a sedimentation section of the clarifier.

8. The assembly of claim 7 wherein said second tubular portions on the same side of said first tubular portion are laterally spaced apart and extending substantially parallel with one another such that said plurality of second tubular portions includes an outer pair and an inner pair thereof.

9. An enhanced flocculation and energy dissipation feedwell assembly for water and wastewater treatment clarifiers, said assembly comprising:

(a) an influent feedwell for disposing about an influent riser pipe of a clarifier from which a liquid enters said influent feedwell, said influent feedwell having a wall defining at least one hole; and (b) at least one feed outlet structure supported on said wall of said influent feedwell, said feed outlet structure including (i) a first tubular portion having opposite first and second ends, said first end being open and attached to and surrounding said hole in said wall of said influent feedwell such that the liquid flows in a first direction from inside said influent feedwell through said open first end of and into said first tubular portion, said second end being closed, and (ii) at least one second tubular portion arranged about and attached adjacent to said second end of said first tubular portion such that the liquid flows in a second direction different from said first direction from inside said first tubular portion through said second tubular portion to a sedimentation section of the clarifier, said second tubular portion having a full annular inner section and a partial annular outer section, said outer section being open along a top thereof.

10. The assembly of claim 9 wherein said feed outlet structure includes a plurality of said second tubular portions.

11. The assembly of claim 10 wherein each of said second tubular portions of said feed outlet structure has a diameter less than a diameter of said first tubular portion of said feed outlet structure.

12. The assembly of claim 9 wherein said inner section of said second tubular portion of said feed outlet structure has a bend at an intermediate location thereon.

13. An enhanced flocculation and energy dissipation feedwell assembly for a water or wastewater treatment clarifier, said assembly comprising:

(a) an influent feedwell for disposing about an influent riser pipe of a clarifier from which a liquid enters said influent feedwell, said influent feedwell having a wall defining a plurality of holes spaced apart from one another; and (b) a plurality of feed outlet structures supported below said wall of said influent feedwell such that adjacent ones of said feed outlet structures are directed relative to one another to achieve opposing jets of discharging liquid to enhance flocculation and distribution of flow and dissipate energy so as to minimize formation of currents, each of said feed outlet structures including (i) a first tubular portion having opposite upper and lower ends, said upper end being open and attached to and about one of said holes in said wall of said influent feedwell such that the liquid flows in a first direction from inside said influent feedwell through said open upper end of and into said first tubular portion, said lower end being closed, and (ii) a plurality of second tubular portions disposed adjacent to but spaced apart from one another and being arranged about and attached adjacent to said lower end of said first tubular portion such that the liquid flows in a second direction different from said first direction from inside said first tubular portion through said second tubular portion to a sedimentation section of the clarifier, each of said second tubular portions of said feed outlet structure having a diameter less than a diameter of said first tubular portion of said feed outlet structure.

14. The assembly of claim 13 wherein wall of said influent feedwell includes a bottom wall having a periphery and an opening for receiving the influent riser piper of the clarifier therethrough, said plurality of holes defined in said bottom wall and being spaced outwardly from said opening, spaced inwardly from said periphery, and spaced apart from one another.

15. The assembly of claim 14 wherein said wall of said influent feedwell further includes a continuous side wall connected to said bottom wall and spaced outwardly from said holes in said bottom wall and being disposed substantially upright from said bottom wall.

16. The assembly of claim 15 wherein said holes in said bottom wall of said influent feedwell are spaced radially outwardly from said opening of said bottom wall and along a circle concentric with said opening.

17. The assembly of claim 14 wherein said opening in said bottom wall of said influent feedwell is defined at a center of said bottom wall.

18. The assembly of claim 14 wherein:

said bottom wall of said influent feedwell has an inner rim encircling said opening in said bottom wall; and said assembly further comprises an annular seal extending between and mounted to at least one of said bottom wall of said influent feedwell and the influent riser pipe of the clarifier and extending over said inner rim and sealing said opening in said bottom wall.

19. An enhanced flocculation and energy dissipation feedwell assembly for a water or wastewater treatment clarifier, said assembly comprising:

(a) an influent feedwell for disposing about an influent riser pipe of a clarifier from which a liquid enters said influent feedwell, said influent feedwell having a wall defining a plurality of holes spaced apart from one another; and (b) a plurality of feed outlet structures supported below said wall of said influent feedwell such that adjacent ones of said feed outlet structures are directed relative to one another to achieve opposing jets of discharging liquid to enhance flocculation and distribution of flow and dissipate energy so as to minimize formation of currents each of said feed outlet structures including
- (i) a first tubular portion having opposite upper and lower ends, said upper end being open and attached to and about one of said holes in said wall of said influent feedwell such that the liquid flows in a first direction from inside said influent feedwell through said open upper end of and into said first tubular portion, said lower end being closed, and
- (ii) a plurality of second tubular portions disposed adjacent to but spaced apart from one another and being arranged about and attached adjacent to said lower end of said first tubular portion so as to have a substantially X-shaped configuration when viewed from above or below and such that the liquid flows in a second direction different from said first direction from inside said first tubular portion through said second tubular portion to a sedimentation section of the clarifier.

20. The assembly of claim 19 wherein said second tubular portions on the same side of said first tubular portion are laterally spaced apart and extending substantially parallel with one another such that said plurality of second tubular portions includes an outer pair and an inner pair thereof.

21. An enhanced flocculation and energy dissipation feedwell assembly for a water or wastewater treatment clarifier, said assembly comprising
- (a) an influent feedwell for disposing about an influent riser pipe of a clarifier from which a liquid enters said influent feedwell, said influent feedwell having a wall defining a plurality of holes spaced apart from one another; and
- (b) a plurality of feed outlet structures supported below said wall of said influent feedwell such that adjacent ones of said feed outlet structures are directed relative to one another to achieve opposing lets of discharging liquid to enhance flocculation and distribution of flow and dissipate energy so as to minimize formation of currents, each of said feed outlet structures including
  - (i) a first tubular portion having opposite upper and lower ends, said upper end being open and attached to and about one of said holes in said wall of said influent feedwell such that the liquid flows in a first direction from inside said influent feedwell through said open upper end of and into said first tubular portion, said lower end being closed, and
  - (ii) a plurality of second tubular portions disposed adjacent to but spaced apart from one another and being arranged about and attached adjacent to said lower end of said first tubular portion such that the liquid flows in a second direction different from said first direction from inside said first tubular portion through said second tubular portion to a sedimentation section of the clarifier, at least some of said second tubular portions having a full annular inner section and a partial annular outer section, said outer section being open along a top thereof.

22. The assembly of claim 21 wherein each of said second tubular portions of said feed outlet structure has a diameter less than a diameter of said first tubular portion of said feed outlet structure.

23. The assembly of claim 21 wherein said inner sections have a bend at an intermediate location thereon.

* * * * *